United States Patent
Reeves et al.

(10) Patent No.: US 6,586,915 B1
(45) Date of Patent: *Jul. 1, 2003

(54) METHOD AND APPARATUS FOR CONTROLLING THE VOLTAGE OF SIGNALS POWERING LOW VOLTAGE LIGHTING SYSTEMS

(76) Inventors: John R. Reeves, 3109 Bunker Dr., Temecula, CA (US) 92591; Randy Weisser, 1240 Sheridan Way, Escondido, CA (US) 92029

( * ) Notice: Subject to any disclaimer, the term of this patent is extended or adjusted under 35 U.S.C. 154(b) by 0 days.

This patent is subject to a terminal disclaimer.

(21) Appl. No.: 10/164,023

(22) Filed: Jun. 5, 2002

Related U.S. Application Data

(63) Continuation of application No. 09/715,930, filed on Nov. 17, 2000, now Pat. No. 6,426,611.

(51) Int. Cl.[7] ................................. G05F 1/577
(52) U.S. Cl. ................ 323/267; 323/300; 307/33
(58) Field of Search .................... 323/265, 267, 323/237, 300, 320; 315/307, 210; 307/31, 33

(56) References Cited

U.S. PATENT DOCUMENTS

| | | | | |
|---|---|---|---|---|
| 4,804,916 A | * | 2/1989 | Frank | 323/300 |
| 5,619,120 A | * | 4/1997 | Barber | 323/237 |
| 5,808,454 A | * | 9/1998 | Chung | 323/255 |
| 6,288,501 B1 | * | 9/2001 | Nakamura et al. | 315/307 |
| 6,426,611 B1 | * | 7/2002 | Reeves et al. | 323/267 |

* cited by examiner

*Primary Examiner*—Adolf Deneke Berhane
(74) *Attorney, Agent, or Firm*—Thomas F. Lebens; Fitch, Even, Tabin & Flannery

(57) ABSTRACT

A power control system and method of power control, the system consists of a power transformer having a primary portion and a secondary portion and a wiring run having a length and coupled at one end to the secondary portion. Also included is a constant voltage controller coupled to another end of the wiring run. The constant voltage controller receives an input power signal from the power transformer and outputs an output power signal at a specified voltage level to a plurality of low voltage electrical loads. The input power signal is at a higher voltage level than the specified voltage level and the output power signal is maintained at the specified voltage level regardless of a change in a voltage drop of the power control system. In preferred embodiments, the system uses low power logic rectifiers to rectify AC power signals to provide reset, current feedback and voltage feedback signals.

27 Claims, 5 Drawing Sheets

METHOD AND APPARATUS FOR CONTROLLING THE VOLTAGE OF SIGNALS POWERING LOW VOLTAGE LIGHTING SYSTEMS

CROSS-REFERENCE TO RELATED APPLICATION

This application is a continuation of U.S. patent application Ser. No. 09/715,930, filed Nov. 17, 2000, now U.S. Pat. No. 6,426,611 (Attorney Docket 68549), of John R. Reeves et al., for METHOD AND APPARATUS FOR CONTROLLING THE VOLTAGE OF SIGNALS POWERING LOW VOLTAGE LIGHTING SYSTEMS, which application is hereby fully incorporated herein by reference.

BACKGROUND OF THE INVENTION

1. Field of the Invention

The present invention relates to power control circuits, and more specifically to power control circuits for low voltage lighting systems. Even more specifically, the present invention relates to power control circuits for low voltage lighting systems having variable loads.

2. Discussion of the Related Art

Low voltage lighting systems, such as found in outdoor lighting systems, typically include electrical loads that use a lower voltage than the standard house current circuit that provides 120 volts AC. Such low voltage lights commonly require a 12 volt AC input.

A transformer is used to convert power at 120 volts AC to power at 12 volts AC that is used for the input at the electrical loads, e.g. the lamps. Typically, in outdoor lighting applications, the lamps are coupled to the transformer via parallel wiring and are located at varying distances from the transformer. The wiring supporting a string of lamps is referred to as a wiring run or a lighting run. Disadvantageously, a lamp load that is electrically remote from the transformer will burn more dimly than an identical lamp load electrically close to the transformer. This results from the resistive loss and consequent voltage drop in the wiring from the transformer to the lamp load. The longer the distance from the transformer, the larger the voltage drop across the wires. Thus, the effective voltage at the lamps may be less than 12 volts AC.

Furthermore, low voltage lighting systems are designed to be flexible in the number and positioning of lamp loads with respect to distance along power distribution wires. However, by changing the number of lamp loads present in the system, the total voltage drop is varied, resulting in an overall brightness change in the remaining lamp loads. For example, an increase in lamp loads with the same power signal, results in a lower voltage at the lamp loads such that each lamp will appear to dim. Additionally, if one lamp load blows, the voltage in the remaining lamps will increase, leading to the remaining lamps running brighter. The increased voltage in the remaining lamps may contribute to their premature failure.

One solution is to distribute power at a high voltage, but locally reduce the voltage for each lamp load. This results in running a high voltage signal from the standard household current circuit to the lamp loads, leading to increased risk of electrical shock in the event of a person accidentally coming into contact with a the wiring carrying the high voltage power signal. Disadvantageously, such a solution also requires a separate transformer at each lamp load to convert the high voltage power signal to a voltage level useable by the respective lamp load.

Another solution is to control the voltage applied to the primary windings of the transformer. Typically, sensing wires are used to sense the voltage applied to the lamp loads and provide feedback to a controller coupled to the primary windings of the transformer. This controller controls the voltage applied to the primary windings which controls the output voltage of the secondary circuit such that the voltage at the lamp loads is at the desired level. Thus, the output voltage is greater than 12 volts AC, but is about 12 volts AC after the voltage drop across the wires. This approach uses triacs at the primary windings and disadvantageously requires additional sensing wires to run from the remotely located electrical loads back to the transformer. Furthermore, since each lighting run will have a respective voltage drop associated with it, each lighting run requires a separate transformer to convert the 120 volt AC power signal to a voltage level that once the voltage drop of the specific lighting run is accounted for, will be about 12 volts AC. Each of the separate transformers is controlled by its own triac in the primary and has its own sensing wires, which significantly add to the cost of the system.

SUMMARY OF THE INVENTION

The present invention advantageously addresses the needs above as well as other needs by providing a constant voltage controller coupled to and located remotely from the secondary of a power transformer for maintaining the voltage at a plurality of electrical loads at a constant level regardless of the voltage drop associated with powering the plurality of electrical loads.

In one embodiment, the invention can be characterized as a power control system including a power transformer having a primary portion and a secondary portion and a wiring run having a length and coupled at one end to the secondary portion. Also included is a constant voltage controller coupled to another end of the wiring run. The constant voltage controller receives an input power signal from the power transformer and outputs an output power signal at a specified voltage level to a plurality of low voltage electrical loads. The input power signal is at a higher voltage level than the specified voltage level and the output power signal is maintained at the specified voltage level regardless of a change in a voltage drop of the power control system.

In another embodiment, the invention can be characterized as a constant voltage controller for maintaining a power signal at a constant voltage at a plurality of electrical loads including a switch receiving an input AC power signal from a secondary portion of a power transformer and outputting an output AC power signal to the plurality of electrical loads. Also included are a controller coupled to the switch and a first logic rectifier circuit coupled to the controller for inputting the output AC power signal and a return AC power signal and outputting a voltage feedback signal to the controller. A second logic rectifier circuit is coupled to the controller and inputs the output AC power signal and outputs a current feedback signal to the controller. And, a reset controller including a third logic rectifier circuit is coupled to the controller for inputting the input AC power signal and outputting a reset signal to the controller. The controller maintains a voltage level of the output AC power signal at a specified level by controlling the operation of the switch based upon the reset signal, the current feedback signal and the voltage feedback signal.

In a further embodiment, the invention can be characterized as a method of controlling the voltage of a power signal for a plurality of electrical loads comprising the steps of: receiving an AC power signal from a secondary portion of a power transformer, wherein the AC power signal is at a voltage greater than a specified level corresponding to the plurality of electrical loads; adjusting the voltage of the AC power signal to a voltage level such that the voltage supplied to the plurality of electrical loads is at the specified level; and maintaining the voltage of the AC power signal at the specified level regardless of a change in a voltage drop experienced by the AC power signal.

In yet another embodiment, the invention can be characterized as a voltage feedback for a power control system for outdoor lighting systems including a switch inputting an input AC power signal and for providing an AC output power signal to a plurality of lamp loads and a controller coupled to the switch and controlling the operation of the switch. Also included is a logic rectifier circuit coupled to the controller wherein the logic rectifier circuit inputs the AC output power signal and a return AC power signal from the plurality of lamp loads. The logic rectifier circuit provides a rectified voltage feedback signal for the controller which is used to adjust the operation of the switch.

In yet another further embodiment, the invention can be characterized as a current feedback for a power control system for outdoor lighting systems including a switch inputting an input AC power signal and for providing an AC output power signal to a plurality of lamp loads and a controller coupled to the switch for controlling the operation of the switch. Also included is a logic rectifier circuit coupled to the controller wherein the logic rectifier circuit inputs the AC output power signal across a current sense resistor. The logic rectifier circuit provides a rectified current feedback signal for the controller which is used to adjust the operation of the switch.

In a subsequent embodiment, the invention can be characterized as a power controller for outdoor lighting systems including a switch inputting an input AC power signal and for providing an AC output power signal to a plurality of lamp loads and a controller coupled to the switch for controlling the operation of the switch. Also included is a logic rectifier circuit coupled to the controller wherein the logic rectifier circuit inputs the AC input power signal and outputs a reset signal for the controller. The reset signal comprises a pulse signal sent to the controller at the beginning of each half cycle of the input AC power signal.

BRIEF DESCRIPTION OF THE DRAWINGS

The above and other aspects, features and advantages of the present invention will be more apparent from the following more particular description thereof, presented in conjunction with the following drawings wherein:

FIGS. 5, 5A and 5B are a schematic diagram of the constant voltage controller of FIG. 3 in accordance with an embodiment of the invention.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

In one embodiment, a power control circuit for outdoor lighting systems is provided that uses low loss power field effect transistors and logic level control circuits to transform AC currents and voltages into usable DC signals to operate a sophisticated phase control circuit. This provides a low cost, low loss, and efficient phase control in the secondary of a power transformer to be used in outdoor lighting systems using approximately 12 volts at currents between 20 and 90 amps.

Figure 1:
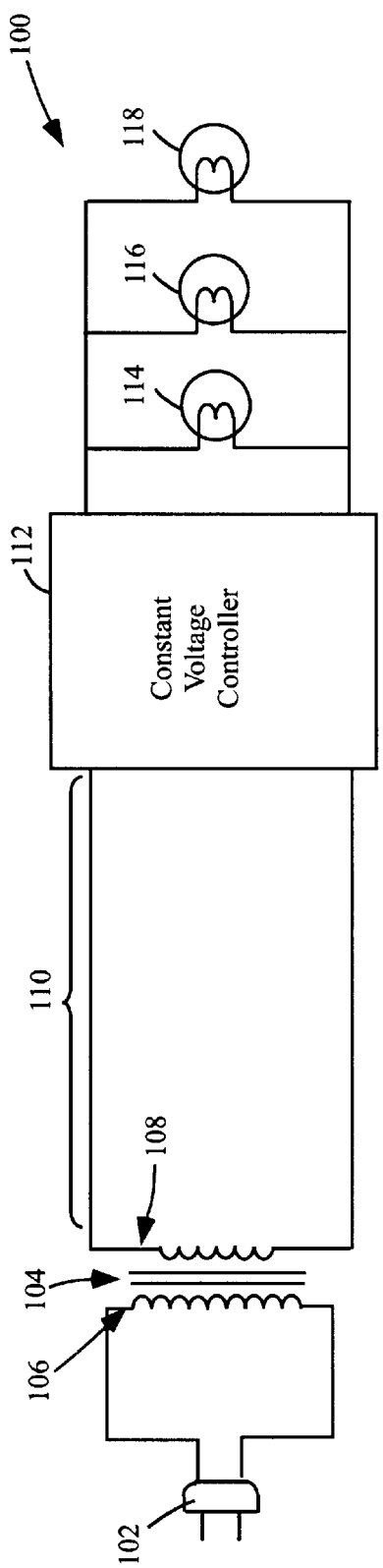
FIG. 1 is a block diagram of a power supply system including a constant voltage controller located remotely from a power supply transformer and for controlling, in the secondary side, the voltage to the lamp loads in accordance with one embodiment of the invention.

Referring first to FIG. 1, a block diagram is shown of a power supply system including a constant voltage controller located remotely from a power supply transformer and for controlling, in the primary side of the power transformer, the voltage to the lamp loads in accordance with one embodiment of the invention. Shown is a power supply system 100 including supply power 102, power transformer 104 (also referred to as a transformer 104) having a primary side 106 and a secondary side 108, wiring run 110, constant voltage controller 112 and lamps 114, 116, and 118 (also referred to generically as electrical loads 114, 116, and 118) electrically coupled in parallel to the constant voltage controller 112.

As is common to outdoor lighting systems, it is preferable to distribute power to low voltage electrical loads, such as lamps 114, 116 and 118 at a lower voltage than the standard household power supply, which is shown as supply power 102 and is a current of 120 volts at 60 hertz. This is due to the fact that most lighting systems have lamps that operate at considerably lower voltages than the supply power at 120 volts AC. For example, most outdoor lighting systems have lamps that operate at 12 volts for safety electrical low voltage (SELV). As such, a power transformer steps down the voltage from the 120 volts AC signal to a 12 volt AC signal. The power is distributed to the lamps 114, 116 and 118 at the lower voltage to advantageously reduce the risk of electrical shock and to avoid the use of separate power transformers located at each set of lamps.

As described above, the lamps 114, 116, and 118 are typically located at the end of a wiring run 110 that is remotely located from the power transformer 104. This wiring run 110 has a voltage drop due to resistance such that the voltage signal at the lamps 114, 116 and 118 may actually be less than 12 volts AC. This lowered voltage results in the lamps illuminating less brightly. Additionally, the further located the lamps 114, 116 and 118 are from the power transformer 104, the higher the voltage drop across the wiring run 110, again affecting the brightness of the lamps 114, 116 and 118. Furthermore, by simply adding or subtracting the number of lamps coupled to a wiring run 110, the total voltage drop is altered, again, effecting the overall brightness of the lamps 114, 116, and 118. For example, the addition of one lamp will increase the voltage drop, and thus, all of the lamps will burn less brightly.

Some conventional approaches distribute the power at a higher voltage and then locally convert the voltage to the required low voltage signal. However, such approaches require a separate transformer at the end of each wiring run. Such transformers are bulky, expensive and difficult to hide in an outdoor environment. This approach is very hazardous due to running the high voltage line to the lamps, e.g., through yards and gardens, which leads to the increased risk of electrical shock. Furthermore, depending on the number of lamps, there is still a variable amount of voltage drop.

Other conventional approaches control the voltage at the primary side 106 of the power transformer 104, for example, with a controller coupled to a triac, such that the power signal produced at the secondary side 108 of the transformer 104 is adjusted to create the desired voltage at the lamps 114, 116, and 118 accounting for the voltage drop across the wiring run. Additional sensing wires can be used to feedback the voltage at the lamps 114, 116 and 118 to a controller coupled to the triad at the primary side 106 of the transformer 104. Additionally, a separate transformer is required for each wiring run, since each wiring run will have its own voltage drop associated therewith.

In contrast, and accordance with an embodiment of the invention, the power supply system 100 provides a transformer 104 capable of providing a power signal at the secondary side 108 that has a greater voltage than the voltage required by the lamps 114, 116 and 118. For example, the transformer 104 converts the 120 volt AC signal to a 20 volt AC signal. As such, given the voltage drop across the length of the wiring run 110, the voltage at the lamps 114, 116, and 118 is not less than the desired voltage of the electrical loads, e.g. 12 volts. Also, advantageously, the power signal coupled to the lamps is at a lower, safer voltage level than the 120 volt AC power supply 102.

Additionally, a constant voltage controller 112 is coupled to the end of the wiring run 110. The lamps 114, 116 and 118 are coupled to the constant voltage controller 112. The constant voltage controller 112 inputs the power signal from the secondary side 108 of the transformer 104 and outputs a power signal to the lamps 114, 116, and 118 that is approximately the desired voltage, e.g. 12 volts AC, using a phase control circuit in one embodiment. The constant voltage controller 112 acts as a hub for the lamps 114, 116 and 118 and reduces the amount of wiring necessary for the lamps, since all lamps 114, 116, and 118 are coupled directly to the constant voltage controller 112, not coupled to the transformer 104 itself.

Advantageously, the constant voltage controller 112 utilizes a low loss power switch, such as a power field effect transistor (FET), to switch the 20 volt AC signal to a 12 volt AC signal. A phase controller within the constant voltage controller 112 delays the point in the phase before the low loss power switch turns on, similar to triac control. Such FET power switches typically have a forward voltage drop of about 0.2 volts; thus, with a 20 amp current in the secondary side 108, the FET dissipates only 4 watts.

Alternatively, a triac based controller may be implemented in the secondary side 108 of the transformer 104, similar to that employed in conventional systems in the primary side 106. However, such triac based controllers in the secondary windings are not employed, since the current output from the secondary side 108 is about 10 times greater than the current at the primary side 106. Due to the voltage drop across the triac and the increased current in the secondary side 108, there will be considerably more power loss than if the triac was on the primary side 106. A triac with about a 1.4 volt forward drop and would disadvantageously dissipate about 28 watts of power (assuming a 20 amp current in the secondary side, according to Watt's law, i.e. P=VI). Thus, triacs coupled to the secondary side 108 of the transformer 104 would require space-consuming heat sinks and the fixtures containing such triacs would get very hot.

Furthermore, the constant voltage controller 112 utilizes low power/low cost semiconductor logic to sense, full wave rectify, and process the power signals. Thus, the input power signal to the constant voltage controller 112 is rectified with a logic rectifier circuit, e.g., an op amp rectifier, to provide a reset signal for the phase controller, the output power signal is rectified with a logic rectifier circuit, e.g., a full wave op amp rectifier, to provide a current sense signal, and the output signal to the lamps and the return signal from the lamps is rectified with a logic rectifier circuit, e.g., a full wave op amp rectifier, to provide a DC voltage sense signal that can easily be used by the phase controller.

Thus, advantageously, the power signal to the lamps 114, 116 and 118 is an AC power signal, not a DC signal. As such, the power signal to the lamps is not required to be rectified to DC. A lamp controller could be easily built such that the AC power signal from the secondary side 108 is rectified to DC by a traditional full wave bridge rectifier, for example. As is known, the diodes of such a rectifier would drop about 2 volts resulting in a 40 watt loss with a 20 amp current in the power signal. Additionally, a silicon controlled rectifier (SCR) would be used to output the power signal to the lamps. There would also be additional power loss from the SCR. Such a circuit would be easy to build since all of the signals are in DC; however, the circuit would suffer from severe power loss and thus impractical.

In accordance with one embodiment, the voltage and current feedback signals are converted to DC using logic rectifier circuits, e.g., op amp rectifiers. These op amp rectifiers only lose about 0.5 watts of power. In another approach in which the power signal remains AC, the current and voltage feedback signals must be rectified to DC. Such an approach would employ current transformers and optocoupler drives to convert these feedback signals to DC. However, current transformers and optocouplers are expensive as well as suffer from power losses. Additionally, as described above, a triac would be used to control the voltage of the power signal to the lamps. Disadvantageously, as discussed above, the triac dissipates about 28 watts in the secondary given about 20 amps of current. In contrast, this embodiment employs a low loss FET power switch instead of a triac. Furthermore, this embodiment does not require additional sensing wires from the lamps 114, 116 and 118 since the constant voltage controller 112 is used. Further details of embodiments of the constant voltage controller 112 are described with reference to FIGS. 3 through 5.

Additionally, the constant voltage controller 112 provides a power signal to the lamps 114, 116, and 118 such that the power signal delivered to the lamps 114, 116, and 118 is maintained at the desired level, for example, 12 volts, regardless of the voltage drop in the wiring run 110 or the supply power from the transformer 104. The constant voltage controller 112 compensates for any voltage drop from the constant voltage controller 112 to the lamps. Furthermore, the constant voltage controller 112 adjusts the output power signal to the lamps 114, 116 and 118, in the event the number of lamps is changed. For example, if more lamps are coupled to the constant voltage controller 112, the constant voltage controller 112 senses the additional voltage drop and adjusts the output power signal to the lamps such that it remains at the desired level. Also, advantageously, if any lamps burn out, the voltage to the remaining lamps is adjusted so that it remains at the desired voltage level, e.g., 12 volts AC. Accordingly, all of the lamps coupled to the constant voltage controller 112 will have the same input power signal at the desired voltage regardless of the number of the lamps or a change in the number of lamps. In operation, a change in the number of lamps will not effect the brightness of the lamps coupled to the constant voltage controller 112.

Due to the modular nature of the system, multiple wiring runs 110 may be coupled to the power transformer 104, each wiring run 110 having a separate constant voltage controller 112 at its end and including a plurality of electrical loads (e.g. lamps) coupled in parallel to the respective constant voltage controller 112.

Additionally, with a constant voltage controller 112 coupled to the end of multiple wiring runs 110, the lamps at the end of each of the wiring runs 110 (i.e. the lamps coupled to each constant voltage controller 112) will all have a power signal at approximately the desired operating voltage. Thus, lamps coupled to adjacent wiring runs 110 will have the same brightness level that is unaffected by the distance from the transformer 104 and by a change in the number of lamps.

It is noted that although only one constant voltage controller 112 is illustrated as being coupled to the secondary side 108 of the power transformer 104, that the skilled artist could easily attach several constant voltage controllers 112 to the secondary, each with multiple lamps 114, 116 and 118 coupled to the respective constant voltage controllers 112, similar to coupling multiple lamps directly to the secondary of the transformer.

Figure 2:
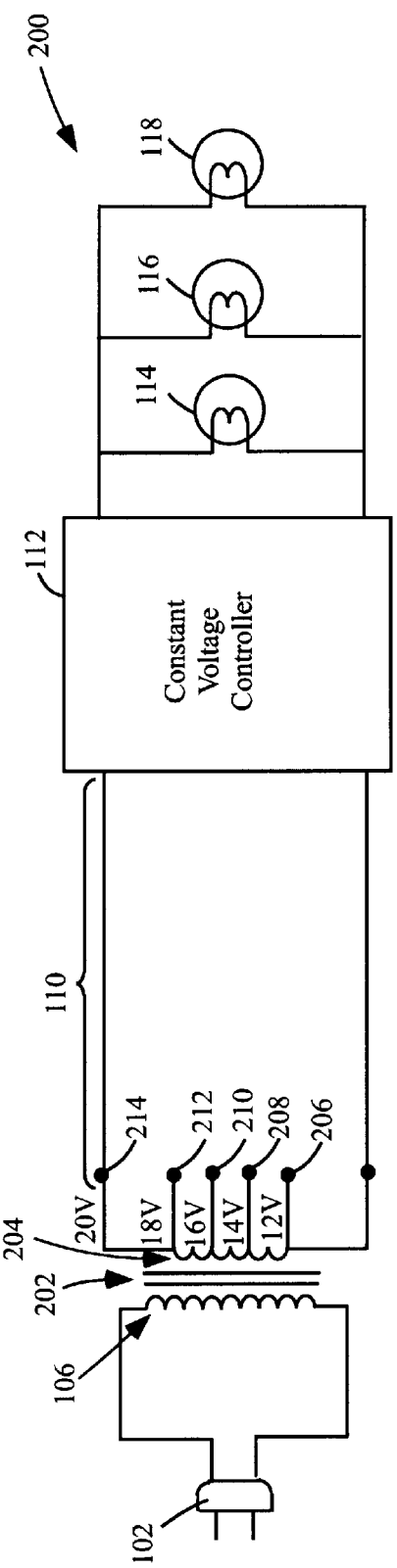
FIG. 2 is a variation of the power supply system of FIG. 1 employing a multiple tap power supply transformer such that the power signal output to the constant voltage controller is selectable in accordance with another embodiment of the invention.

Referring next to FIG. 2, a variation of the power supply system 100 of FIG. 1 is shown employing a multiple tap power transformer 202 such that the power signal output to the constant voltage controller 112 is selectable in accordance with another embodiment of the invention. The power supply system 200 of FIG. 2 has the same components as the power supply system 100 of FIG. 1 except the power supply system 200 of FIG. 2 uses a multiple tap power transformer 202 in place of power transformer 104. This multiple tap power transformer 202 provides multiple taps 206, 208, 210, 212, and 214 in the secondary side 204 that provide a selectable voltage level in the output power signal. For example, the multiple tap power transformer 202 provides power signals at 12 volts AC, 14 volts AC, 16 volts AC, 18 volts AC and 20 volts AC (e.g. at taps 206, 208, 210, 212, and 214). Such a multiple tap power transformer 202 is commercially available from Unique Lighting Systems of Escondido, Calif., as a "Multimatic Power Transformer", e.g., Part No. T-840SS. Other suitable transformers available from Unique Lighting Systems include Multimatic Power Transformers Part Nos. T-300SS, T-360SS, T-500SS, T-600SS and T-1120SS. Advantageously, the lighting designer can choose which of the multiple taps to attach a wiring run 110 and constant voltage controller 112, depending on the desired voltage of the electrical loads 114, 116 and 118, the voltage drop across the wiring run 110, and the number of electrical loads to be coupled to the constant voltage controller 112. Generally, in several embodiments of the invention, it is desirable to have the voltage of the power signal output from the multiple tap power transformer 202 to be greater than the operating voltage of the electrical loads so that the constant voltage controller 112 can appropriately adjust and maintain the power signal to the electrical loads at the desired level. Furthermore, whether using the multiple tap power transformer 202 of FIG. 2 or the power transformer 104 of FIG. 1, it is important to note that the current in the secondary side 108 and 208 is relatively high, for example, greater than 15 amps, e.g., 20 amps, 50 amps, 90 amps, etc. This is important because it effects the power loss in devices that the current passes through. For example, the higher the voltage drop across a device, the higher the power loss.

Figure 3:
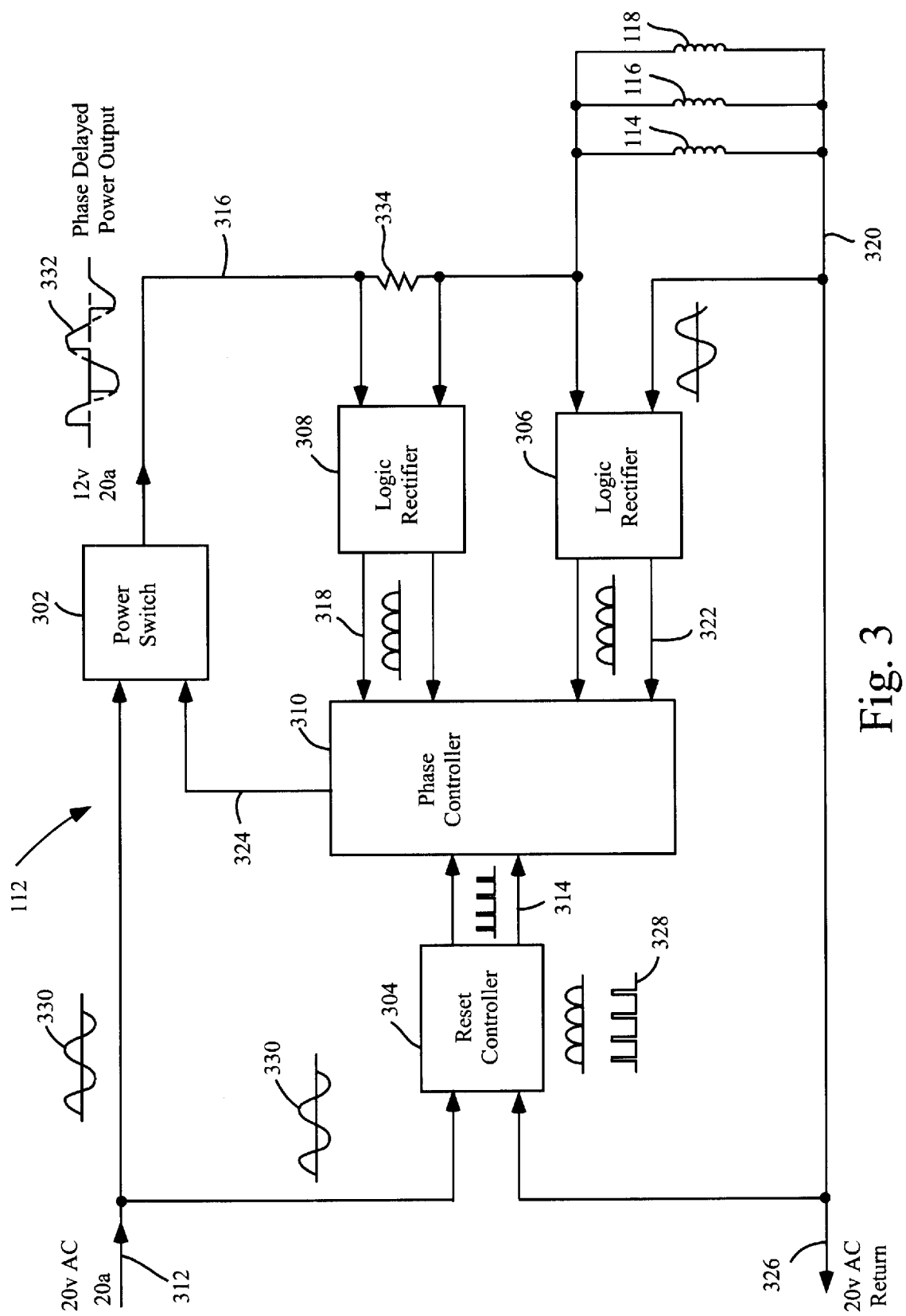
FIG. 3 is a functional block diagram of one embodiment of the constant voltage controller of FIG. 2.

Referring next to FIG. 3, a functional block diagram is shown of one embodiment of the constant voltage controller of FIG. 2 employing a phase controller. Shown is the constant voltage controller 112 including a power switch 302 (also referred to generically as a switch 302), a reset controller 304, a first logic rectifier circuit 306, a second logic rectifier circuit 308, and a phase controller 310. Also illustrated are the input power signal 312, a reset signal 314, an output power signal 316, a current feedback signal 318, a lamp return signal 320, a voltage feedback signal 322, a timer signal 324, and a return signal 326. Also illustrated are lamps 114, 116 and 118.

The input power signal 312 is received from the power transformer of power supply system, e.g. power transformer 104. In this example, the input power signal 312 is at approximately 20 volts AC, although may be less due to the voltage drop in the wiring used to distribute the power signal to the constant voltage controller 112. However, in this embodiment of the invention, it is important that the input power signal 312 be at a voltage that is greater than the operating voltage of the electrical load/s, e.g. greater than 12 volts AC. The input power signal 312 is input into the constant voltage controller 112 which operates to keep the voltage to the lamps constant by delaying the point in the phase before the power switch 302 turns on, similar to triac control.

The input power signal 312 is fed into the reset controller 304 which is a logic rectifier circuit, e.g., a full wave op amp rectifier, in order to output a reset signal 314 to the phase controller 310. This reset signal 314 is illustrated as a DC pulse signal 328 that is sent at the beginning of each half cycle of the input power signal 312. Thus, the input power signal 312 is rectified to DC and referenced to logic common. This is a departure from the prior art in that phase control circuits in the primary side which may be used for triac control in the primary use full wave bridge rectifiers which use 4 diodes per phase to provide such signals as opposed to logic rectifier circuits. If employed in the secondary side, such full wave bridge rectifiers, for example, which have a 2.0 volt drop, would result in a 40 watt power loss given a current in the secondary of 20 amps. In contrast, the use of low power analog logic, such as op amp type rectifiers, results in much lower power loss than full wave bridge rectifiers (e.g. about 0.5 watts power loss compared to about 40 watts for the full wave bridge rectifier). Note that in other embodiments, the current in the AC power signal 312 is greater than 20 amps, e.g., 50 amps or 90 amps, such that there is an even greater power loss from the use a full wave bridge rectifier in comparison to an op amp type rectifier. Thus, op amp rectifiers require very little DC power and dissipate very little power in comparison to full wave bridge rectifiers. Full wave op amp rectifiers are well known and understood by those skilled in the art. Note that the reset controller 304 also inputs the return signal 326.

The phase controller 310 is a logic circuit which is used as a timer for the low loss switch 302. This phase control circuit is similar to such control circuits used to control a triac. The phase controller 130 inputs the reset signal 314 and delays the point in the phase before the switch 302 turns on via the timer signal 324; thus, reducing the voltage of the output signal 316 to a desired level. The longer the delay, the lower the voltage applied to the lamps in the output power signal 316. The input power signal 312 is an AC signal which is illustrated as AC waveform 330, while the phase delayed output power signal 316 is illustrated as AC waveform 332.

The timer delay of the phase controller 310 utilizes a current sense signal 318 which provides a measure of the current of the output power signal 316 and a voltage sense signal 322 that provides a measure of the voltage as applied to the lamps in order to control the exact point at which the switch 302 is turned on. Advantageously, a first logic rectifier circuit 306, e.g., a full wave op amp rectifier, rectifies the lamp return signal 320 and the output power signal 316. This provides a DC value used to estimate the voltage actually applied to the lamps 114, 116 and 118. The phase controller 310 uses the voltage feedback signal 322 to determine how much delay in the phase of the input voltage signal 312 will bring the voltage of the output power signal 316 to the specified level. For example, the phase controller 310 includes a voltage sense circuit that is configured to sense voltage at 12 volts rms. If the voltage at the lamps is too high, then the voltage sense circuit of the phase controller 310 induces a longer delay between before turning on the power switch 302 with the timer signal 324. Such voltage sense circuits and logic rectifier circuits 306 are well known in the art; however, the use of low power, semiconductor logic rectifiers (e.g., op amps) to full wave rectify the AC power signal 316 and the AC lamp return signal 320 for providing a voltage feedback signal 322 is novel, regardless of whether the constant voltage controller 112 is in the primary or the secondary of the main power transformer. In triac based controllers, such signals would be rectified by full wave bridge rectifiers, which if as described above as are used in the secondary, experience a large power loss, at least with the current levels in the secondary of the power transformer.

The power switch 302 is preferably embodied as a low loss FET. Since the input power signal 312 is AC in nature, the low loss switch 302 comprises two FETs connected in series. These FETs are specially designed to distribute power signals with low losses since they typically only have a 0.2 voltage drop or less. Thus, both FETs dissipate about 4 watts with 20 amps of current, in comparison to a triac with a 1.4 voltage drop and a current of about 20 amps (i.e., about 28 watt power loss in the secondary). Furthermore, FETs are now known with about a 0.08 voltage drop, such that two back-to-back FETs would have about a 0.16 voltage drop; thus, a power loss of 3.2 watts (with 20 amps of current in the secondary).

Furthermore, in order to protect against short circuiting of the lamps 114, 116 and 118 and other current surges that might damage the power switch 302 (or the transformer 104 or the wiring 110) as well as provide a soft start for the lamps 114, 116 and 118, the constant voltage controller 112 includes a second logic rectifier circuit 308 which is used to provide a current feedback signal 318 to the phase controller 310. Thus, the AC output power signal 316 is rectified across a current sense resistor 334 with the logic rectifier circuit 308, e.g., a full wave op amp rectifier. Again, the second logic rectifier circuit 308 rectifies the AC signal to DC referenced at logic common. The second logic rectifier circuit 308 outputs a current feedback signal 318 to the phase controller 310 to delay the turn on of the power switch 302 in the event of an overload or short circuit to the lamps. Additionally, the current feedback signal 318 advantageously reduces damaging current surge to the lamps at power up or switch on. Such a logic rectifier circuit is well known in the art, although the use of the low power semiconductor logic rectifier circuit 308 to full wave rectify the output power signal 316 to provide a current feedback signal 318 is a departure from the prior art. Typically, full wave bridge rectifiers are employed to rectify the AC signal to control a phase controlled triac. However, phase controlled triacs are employed on the primary side of the power transformer since the current on the primary is much less than the current in the secondary.

Furthermore, a full wave bridge rectifier could be used in the secondary to convert the AC power signal to a DC power signal such that a control circuit in the secondary could easily be designed to control the voltage of the DC power signal to the lamps. However, again, the full wave bridge rectifier suffers from significant power loss in the secondary and the output power signal to the lamps is a DC signal. In contrast, the input power signal 312 and the output power signal 316 remain as AC signals in this embodiment. Again, the use of low power semiconductor logic rectifier circuits, such as op amp rectifiers, have a much lower power loss than full wave bridge rectifiers, and result in significant reductions in the power dissipation.

Additionally, in this embodiment, since the current feedback signal 318 is provided by the second logic rectifier circuit 308, current sense transformers, as known in the art, are not required. Such current sense transformers are expensive and bulky.

It is also noted that the constant voltage controller 112 advantageously provides an AC output power signal 316 that is maintained at the desired voltage level irrespective of the length of the wiring run or the number of lamps coupled to the constant voltage controller 112. The output power signal 316 is maintained at this level by providing a reset signal 314, the voltage feedback signal 322 and the current feedback signal 318, all of which are logic level DC signals that are rectified to DC by low loss, semiconductor, logic rectifiers, e.g., full wave op amp rectifier circuits. This is a departure from the known art in that all of these respective signals are rectified by logic rectifier circuits. Typically, such signals are already in DC (in the event of a DC power signal) or are rectified to DC by expensive, high loss components (e.g., current transformers and full wave bridge rectifiers). Thus, the phase controller 310, power switch 302, reset controller 304, and the first and second logic rectifier circuits 306 and 308 are all simple logic circuits. This "logic only" circuit could be advantageously implemented within a single integrated circuit that would be very cost effective in comparison to other control circuits that might use current transformers, for example.

Furthermore, it is noted that such a logic only approach of rectifying an AC voltage power signal to provide a reset signal 314, a current feedback signal 318, or a voltage feedback signal 322 is new, regardless of whether provided at the primary side or secondary side of the transformer. Power signals of other systems are already in a DC form, since the power signal itself is already in DC, or the signals may be rectified to DC using high loss, expensive components, such as current transformers or full wave bridge rectifiers.

The result is that the constant voltage controller 112 as a logic only controller can be made very small and easily mounted within a small hub that measures, for example, 3.5 inches square.

As such, as long as the input power signal 312 is at a voltage that is greater than the operating voltage level, or desired voltage level of the lamps 114, 116 and 118, then the constant voltage controller 112 is able to sense the output voltage and the output current to set the phase controller 310 to introduce a desired amount of delay in the phase before turning on the power switch 302. Thus, the voltage of the output power to the lamps can be regulated to remain at the desired level regardless of the distance of the lamps from the power transformer, the supply voltage from the transformer, and whether the number of lamps has changed.

Additionally, since the voltage feedback signal 322 and the current feedback signal 318 are implemented with logic rectifier circuits, i.e. first and second logic rectifier circuits 306 and 308, at the output power signal 316 and the lamp return signal 320, additional sensing wires are not required. This is in contrast to conventional triac controllers in the primary which require additional sensing wires to feedback the voltage applied to the lamp loads.

Figure 4:
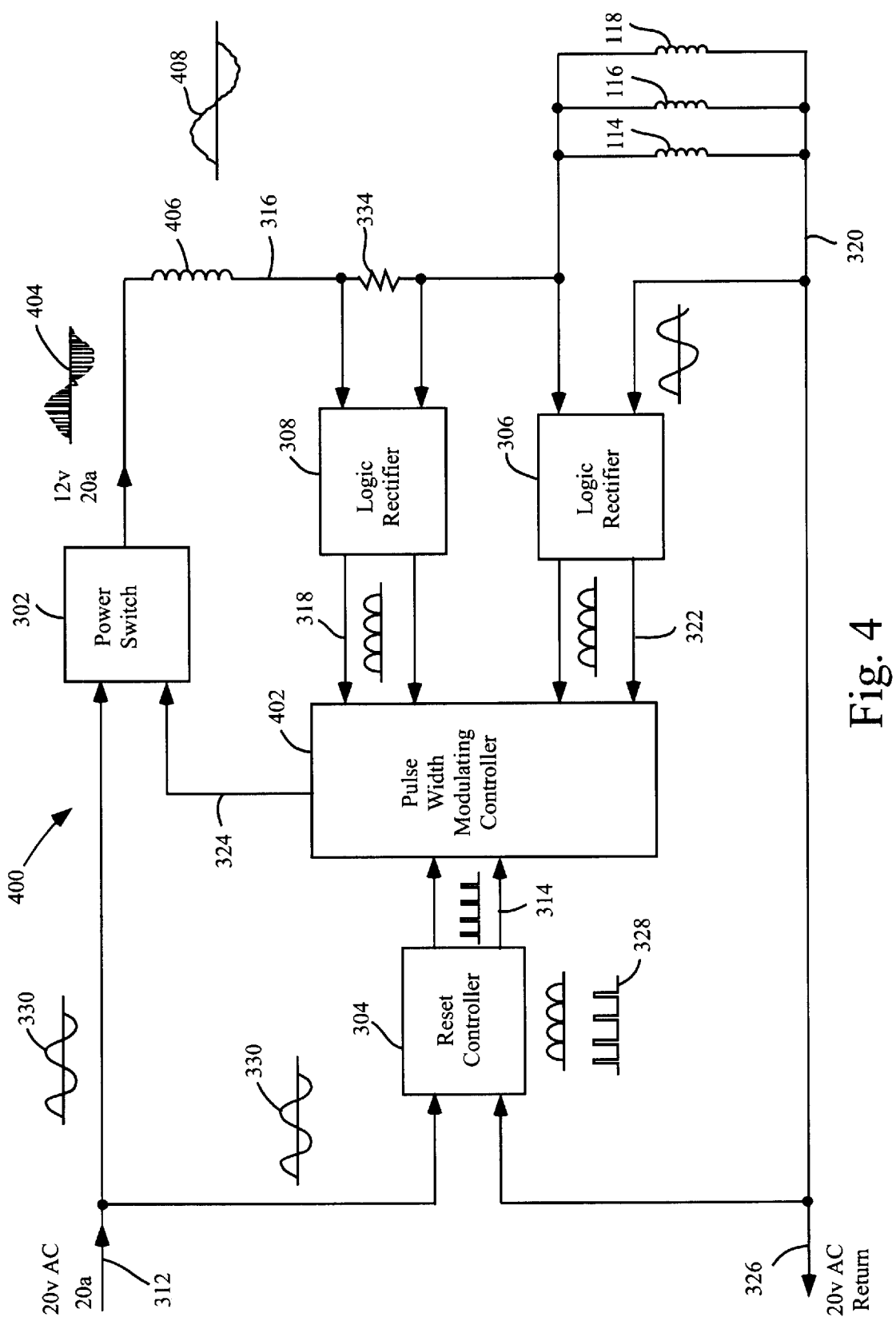
FIG. 4 is a functional block diagram of another embodiment of the constant voltage controller of FIG. 2.

Referring next to FIG. 4, a functional block diagram is shown of another embodiment of the constant voltage controller of FIG. 2 employing a pulse width modulating controller. Shown is a constant voltage controller 400 having the same components as the constant voltage controller 112 of FIG. 3, except replacing the phase controller 310 with the pulse width modulating controller 402 and including a smoothing inductor 406. The remaining components of the constant voltage controller 400 of FIG. 4 function the same as those corresponding to the constant voltage controller 112 of FIG. 3.

The pulse width modulating controller 402, instead of delaying the point in the phase before the power switch 302 turns on, uses the power switch 302 to modulate each cycle of the 60 Hz input power signal 312 at a higher frequency (see waveform 404), e.g., 2 kHz to 100 kHz, and then smooth the signal with the smoothing inductor 406 to produce a lower voltage sinusoidal 60 Hz waveform (see waveform 408), e.g., so that the output power signal 316 to the lamps is at the desired voltage level. Such an approach would produce more electromagnetic interference (EMI) and would be more expensive than using a simple phase control circuit. Such pulse width modulating circuits are well known in the art, although, again the use of such circuits in the secondary of the power transformer is a departure from the known art. Such circuits have previously only been applied in the primary side of the power transformer due to the lower current in the primary. The lower current of the primary is important due to the power dissipation involved in rectifying the AC signals for the voltage sensing and current sensing circuits. Again, the use of low power semiconductor logic rectifier circuits, e.g. op amp rectifiers, to rectify the AC signals to logic level DC for the reset signal 314, the current feedback signal 318, the voltage feedback signal 322, as well as the use of FETs for the power switch 302 as opposed to a triac, allows the constant voltage controller 112 to be located in the secondary remote from the power transformer.

Figure 5A:
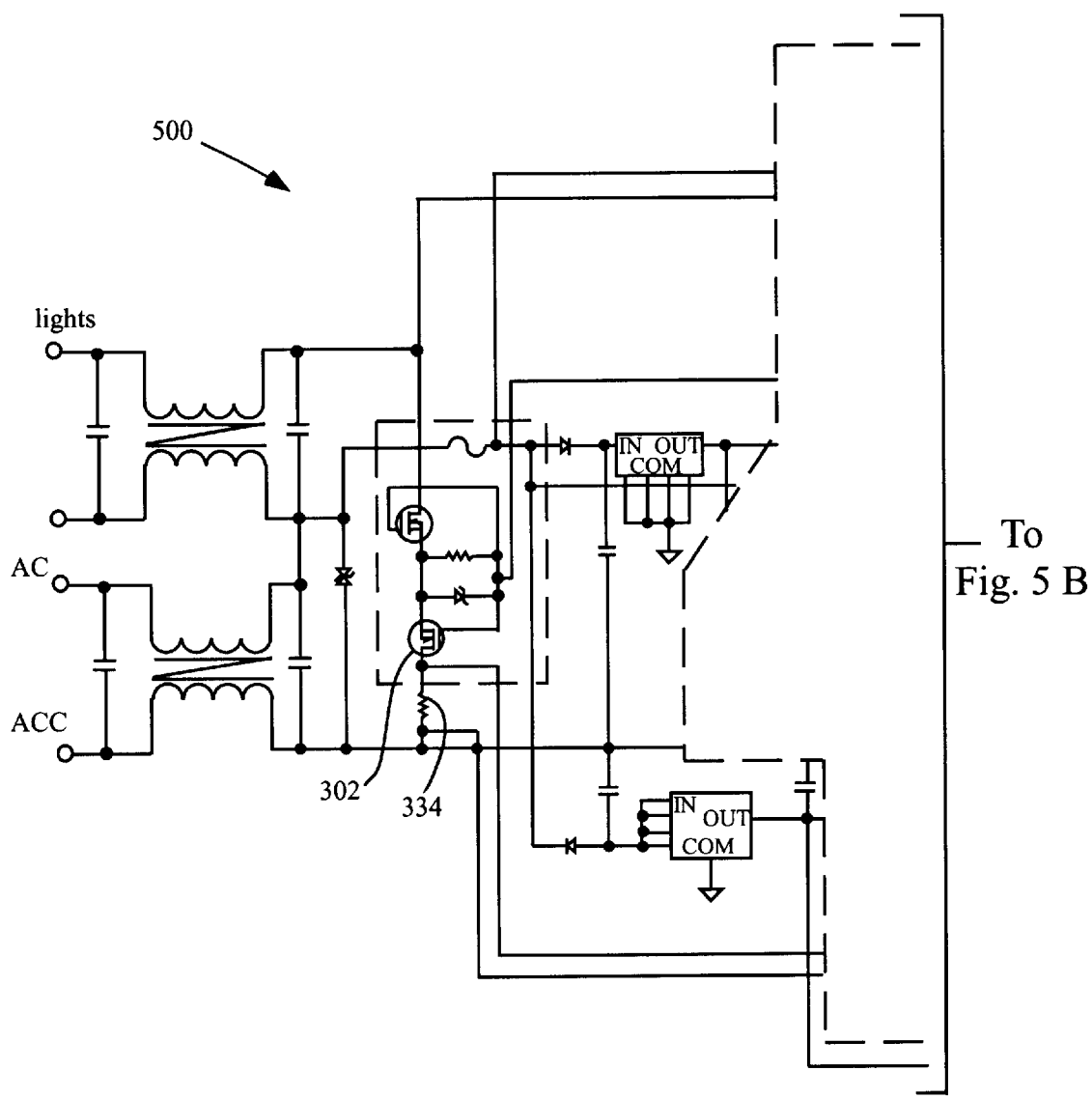
Figure 5B:
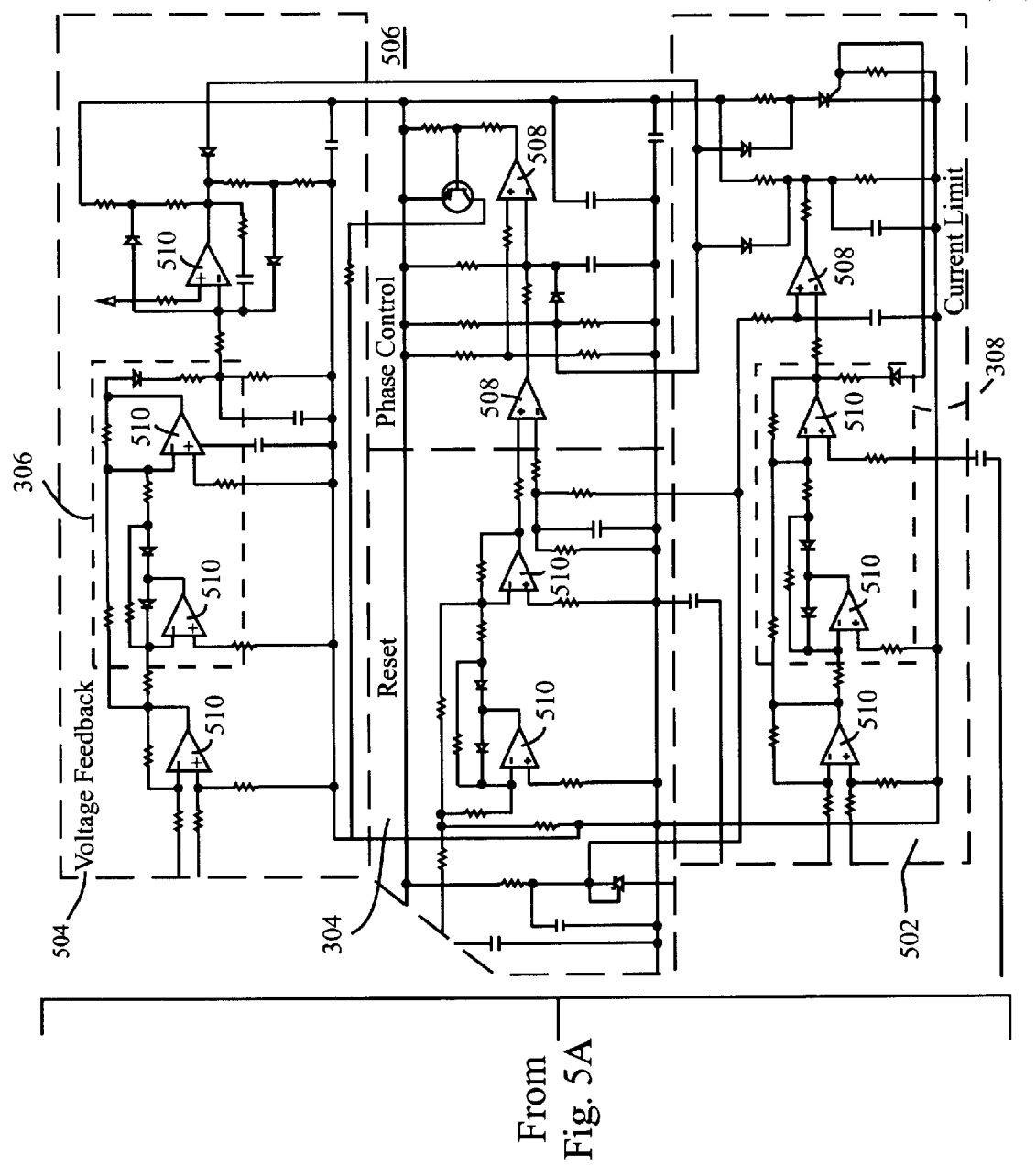

Referring next to FIG. 5, a schematic diagram 500 of the constant voltage controller 112 of FIG. 3 is shown in accordance with an embodiment of the invention. The schematic diagram is well understood to those skilled in the art; thus, no further explanation is provided. However, generally, the various components of the constant voltage controller are shown is dashed lines. For example, the power switch 302 and the reset controller 304 are illustrated. Also shown are a current sense circuit 502 (which includes the second logic rectifier circuit 308) and a current sense resistor 334. Also, voltage sense circuit 504 is shown which includes the first rectifier circuit 306. And a phase control circuit 506 of the phase controller 310 of FIG. 3 is shown. It is noted that the phase controller 310 of FIG. 3 includes the phase control circuit 506 and various components of the current sense circuit 502 and the voltage sense circuit 504 as is understood to one skilled in the art. Also shown are the comparators 508 and the amplifiers 510.

While the invention herein disclosed has been described by means of specific embodiments and applications thereof, numerous modifications and variations could be made thereto by those skilled in the art without departing from the scope of the invention set forth in the claims.

What is claimed is:

1. A power control system comprising:
    a power transformer having a primary portion and a secondary portion;
    a wiring run having a length and coupled at one end to the secondary portion;
    a constant voltage controller coupled to another end of the wiring run, wherein the constant voltage controller receives an input power signal from the power transformer and outputs an output power signal at a specified voltage level to a plurality of low voltage electrical loads, wherein the input power signal is at a higher voltage level than the specified voltage level, wherein the output power signal is maintained at the specified voltage level regardless of a change in a voltage drop of the power control system.

2. The power control system of claim 1 wherein the output power signal is maintained at the specified voltage level regardless of a change in a voltage drop in the wiring run.

3. The power control system of claim 1 wherein the output power signal is maintained at the specified voltage level regardless of a change in a voltage drop across the plurality of low voltage electrical loads.

4. The power control system of claim 1 wherein the output power signal is maintained at the specified voltage regardless of a change in the number of the plurality of low voltage electrical loads.

5. The power control system of claim 1 wherein the power transformer comprises a multiple tap power transformer.

6. The power control system of claim 1 wherein the input power signal and the output power signal are AC signals.

7. The power control system of claim 6 wherein the constant voltage controller includes a reset controller to rectify the input power signal to provide a DC reset signal to a controller.

8. The power control system of claim 6 wherein the constant voltage controller includes a first logic rectifier circuit to rectify the output power signal to provide a DC current feedback signal to a controller.

9. The power control system of claim 6 wherein the constant voltage controller includes a first logic rectifier circuit to rectify the output power signal and a lamp return power signal to provide a DC current feedback signal to a controller.

10. The power control system of claim 9 further comprising:
    a second logic rectifier circuit to rectify the input power signal to provide a DC reset signal to the controller; and
    a third logic rectifier circuit to rectify the output power signal to provide a DC current feedback signal to the controller.

11. The power control system of claim 1 further comprising the plurality of low voltage electrical loads coupled to the constant voltage controller, wherein the plurality of low voltage electrical loads comprise a plurality of low voltage outdoor lights.

12. The power control system of claim 1 wherein the controller comprises at least one field effect transistor to switch the input power signal to the output power signal.

13. A method of controlling the voltage of a power signal for a plurality of electrical loads comprising:

receiving an AC power signal from a secondary portion of a power transformer, wherein the AC power signal is at a voltage greater than a specified level corresponding to the plurality of electrical loads;

adjusting the voltage of the AC power signal to a voltage level such that the voltage supplied to the plurality of electrical loads is at the specified level; and maintaining the voltage of the AC power signal at the specified level regardless of a change in a voltage drop experienced by the AC power signal.

14. The method of claim 13 further comprising outputting the AC power signal to the plurality of electrical loads.

15. The method of claim 14 further comprising rectifying the AC power signal having been output and a return AC power signal from the plurality of electrical loads with a first logic rectifier circuit to provide a voltage feedback signal.

16. A voltage feedback for a power control system for outdoor lighting systems comprising:

a switch inputting an input AC power signal and for providing an AC output power signal to a plurality of lamp loads;

a controller coupled to the switch and controlling the operation of the switch; and a logic rectifier circuit coupled to the controller wherein the logic rectifier circuit inputs the AC output power signal and a return AC power signal from the plurality of lamp loads, wherein the logic rectifier circuit provides a rectified voltage feedback signal for the controller which is used to adjust the operation of the switch.

17. The voltage feedback of claim 16 wherein the logic rectifier circuit comprises a full wave op amp rectifier.

18. The voltage feedback of claim 16 wherein the switch is coupled to a primary portion of a power transformer and the plurality of lamp loads are coupled to a secondary portion of the power transformer, wherein the plurality of lamp loads are coupled to the switch via the power transformer.

19. The voltage feedback of claim 16 wherein the switch is coupled to a secondary portion of a power transformer and the plurality of lamp loads are coupled to the switch.

20. A current feedback for a power control system for outdoor lighting systems comprising:

a switch inputting an input AC power signal and for providing an AC output power signal to a plurality of lamp loads;

a controller coupled to the switch for controlling the operation of the switch; and a logic rectifier circuit coupled to the controller wherein the logic rectifier circuit inputs the AC output power signal across a current sense resistor, wherein the logic rectifier circuit provides a rectified current feedback signal for the controller which is used to adjust the operation of the switch.

21. The voltage feedback of claim 20 wherein the logic rectifier comprises a full wave op amp rectifier.

22. The voltage feedback of claim 20 wherein the switch is coupled to a primary portion of a power transformer and the plurality of lamp loads are coupled to a secondary portion of the power transformer, wherein the plurality of lamp loads are coupled to the switch via the power transformer.

23. The voltage feedback of claim 20 wherein the switch is coupled to.a secondary portion of a power transformer and the plurality of lamp loads are coupled to the switch.

24. A power controller for outdoor lighting systems comprising:

a switch inputting an input AC power signal and for providing an AC output power signal to a plurality of lamp loads;

a controller coupled to the switch for controlling the operation of the switch;

a logic rectifier circuit coupled to the controller wherein the logic rectifier circuit inputs the AC input power signal and outputs a reset signal for the controller, wherein the reset signal comprises a pulse signal sent to the controller at the beginning of each half cycle of the input AC power signal.

25. The voltage feedback of claim 24 wherein the logic rectifier circuit comprises a full wave op amp rectifier.

26. The voltage feedback of claim 24 wherein the switch is coupled to a primary portion of a power transformer and the plurality of lamp loads are coupled to a secondary portion of the power transformer, wherein the plurality of lamp loads are coupled to the switch via the power transformer.

27. The voltage feedback of claim 24 wherein the switch is coupled to a secondary portion of a power transformer and the plurality of lamp loads are coupled to the switch.

* * * * *